United States Patent
Chowdhury et al.

(10) Patent No.: US 12,547,837 B2
(45) Date of Patent: Feb. 10, 2026

(54) ARTIFICIAL INTELLIGENCE BASED METADATA SEMANTIC ENRICHMENT

(71) Applicant: International Business Machines Corporation, Armonk, NY (US)

(72) Inventors: Md Faisal Mahbub Chowdhury, Ardsley, NY (US); Alfio Massimiliano Gliozzo, Brooklyn, NY (US); Nandana Sampath Mihindukulasooriya, Sunnyside, NY (US); Michael Robert Glass, Bayonne, NJ (US); Sarthak Dash, Jersey City, NJ (US); Sugato Bagchi, White Plains, NY (US); Gaetano Rossiello, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 18/409,341

(22) Filed: Jan. 10, 2024

(65) Prior Publication Data
US 2025/0225328 A1    Jul. 10, 2025

(51) Int. Cl.
G06F 17/00    (2019.01)
G06F 40/30    (2020.01)

(52) U.S. Cl.
CPC .................... G06F 40/30 (2020.01)

(58) Field of Classification Search
None
See application file for complete search history.

(56) References Cited

U.S. PATENT DOCUMENTS

| 5,752,253 A | 5/1998 | Geymond et al. |
| 7,209,923 B1 | 4/2007 | Cooper |

(Continued)

FOREIGN PATENT DOCUMENTS

| CN | 112559556 B | 5/2021 |
| CN | 112988785 B | 8/2021 |

(Continued)

OTHER PUBLICATIONS

Aghajanyan, Armen et al., "Muppet: Massive Multi-task Representations with Pre-Finetuning", arXiv:2101.11038v1 [cs.CL], Jan. 26, 2021, 12 pages.

(Continued)

*Primary Examiner* — Satwant K Singh

(57) ABSTRACT

Mechanisms are provided for automatically generating semantical enhanced metadata for a structured data structure. Multi-task machine learning training is performed, based on data comprising separate sets of training data samples for each of a plurality of semantic metadata enhancement tasks, of a base artificial intelligence (AI) computer model to thereby generate a fine-tuned AI computer model trained to specifically generate semantically enhanced metadata for structured data structures. A prompt is received that specifies a structure of an input structured data structure and requests a semantic metadata enhancement task from the plurality of semantic metadata enhancement tasks. The fine-tuned AI computer model processes the prompt to generate semantically enhanced metadata for the structure of the input structured data structure and provide it to a downstream computing system for performing a downstream computing operation based on the semantically enhanced metadata.

20 Claims, 5 Drawing Sheets

(56) References Cited

U.S. PATENT DOCUMENTS

| | | | |
|---|---|---|---|
| 10,692,484 | B1* | 6/2020 | Merritt .................... G10L 13/08 |
| 11,250,872 | B2 | 2/2022 | Thomas et al. |
| 11,763,832 | B2* | 9/2023 | Nesta ...................... G06N 3/088 |
| | | | 704/232 |
| 11,989,519 | B2* | 5/2024 | Platt ......................... G06N 5/02 |
| 2020/0226327 | A1* | 7/2020 | Matusov ............... G06F 18/214 |
| 2020/0410981 | A1* | 12/2020 | Merritt ................. G06N 3/0442 |
| 2023/0325725 | A1* | 10/2023 | Lester ................. G06V 10/7747 |
| 2024/0378196 | A1* | 11/2024 | Lester .................... G06N 20/00 |

FOREIGN PATENT DOCUMENTS

| | | | | |
|---|---|---|---|---|
| CN | 113986958 | A | 1/2022 | |
| CN | 114547329 | A | 5/2022 | |
| WO | WO-2023022727 | A1 * | 2/2023 | ........... G06F 16/243 |
| WO | WO2023/026166 | A1 | 3/2023 | |

OTHER PUBLICATIONS

Bao, Junwei et al., "Text Generation From Tables", IEEE/ACM Transactions on Audio, Speech, and Language Processing, vol. 27, Issue 2, Feb. 2019, published Oct. 26, 2018, 19 pages.

Caruana, Rich, "Multitask Learning", Machine Learning, vol. 28, No. 1, Jul. 1997, 35 pages.

Deng, Xiang et al., "TURL: Table Understanding through Representation Learning", arXiv:2006.14806v2 [cs.IR], Dec. 3, 2020, 14 pages.

Gottumukkala, Ananth et al., "Dynamic Sampling Strategies for Multi-Task Reading Comprehension", Proceedings of the 58th Annual Meeting of the Association for Computational Linguistics, Jul. 5-10, 2020, 5 pages.

Liu, Shikun et al., "End-to-End Multi-Task Learning with Attention", IEEE Conference on Computer Vision and Pattern Recognition, CVPR 2019, Long Beach, CA, USA, Jun. 16-20, 2019, 10 pages.

Muennighoff, Niklas et al., "Crosslingual Generalization through Multitask Finetuning", arXiv:2211.01786v2 [cs.CL], May 29, 2023, 119 pages.

Raffel, Colin et al., "Exploring the Limits of Transfer Learning with a Unified Text-to-Text Transformer", Journal of Machine Learning Research, vol. 21, Issue 1, Article 140, Jan. 1, 2020, 67 pages.

Ruder, Sebastian, "An Overview of Multi-Task Learning in Deep Neural Networks", arXiv:1706.05098v1 [cs.LG], Jun. 15, 2017, 14 pages.

Weller, Orion et al., "When to Use Multi-Task Learning vs Intermediate Fine-Tuning for Pre-Trained Encoder Transfer Learning", arXiv:2205.08124v1 [cs.CL], May 17, 2022, 11 pages.

Xu, Junjie H. et al., "Table Caption Generation in Scholarly Documents Leveraging Pre-trained Language Models", 2021 IEEE 10th Global Conference on Consumer Electronics (GCCE), Oct. 12-15, 2021, 5 pages.

\* cited by examiner

{"source": "Column names for caption: STATISTIC CODE | Statistic | Age Group | Sex | Family and non-family households | Marital Status | CensusYear | UNIT | VALUE . [SEP] Table caption.",
"target": "Persons in Private Households ."} ~ 350    310

{"source": "Table caption for columns: Average Number of Persons per Private Household in Permanent Housing Units . [SEP] Column names.",
"target": "Aggregate Town or Rural Area | Province County or City | CensusYear | STATISTIC CODE | Statistic | UNIT | VALUE ."} ~ 360    320

{"source": "Column names for tags: Geography | Hospital | Emergency room/Outpatient | Dead on arrival | Nursing home | Home | Other | Unknown | Unspecified | Total . [SEP] Table tags.",
"target": "causes-of-death, death, mortality ."}    330

{"source": "Column name: item . [SEP] Other column names: Parent Agency | Child Agency | Agency or Department Name | Appropriation (Dept) ID | Program Name | Program Description | Recipient Name | Recipient City | Recipient State | Recipient Zip | Recipient County | Amount Expended to Date | Internal Expense Category . [SEP] Column description.",
"target": "The category of expense."}    340

*FIG. 3*

A table has the following columns: REF_DATE, GEO, DGUID, Selected industry group, Cateogry of patent acquisition, UOM, UOM_ID, SCALAR_FACTOR, SCALAR_ID, VECTOR, COORDINATE, VALUE, STATUS, SYMBOL, TERMINATED, DECIMALS.

Generate title and tags for the table, and description for the columns.

410

---

Title: Patent data – patent applications and grants.

Tags: patent applications, patent grants.

Description of the columns:

REF_DATE – Date of reference.
GEO – Geographic region.
DGUID – Unique Identifier for the patent.
Selected industry group – industry group.
Category of patent acquisition – Type of patent acquisition.
UOM – Unique identifier for the unit of measure.
UOM_ID – Unique identifier for the unit of measure.
SCALAR_FACTOR – Factor of the unit of measure.
SCALAR_ID – Unique identifier for the unit of measure.
VECTOR – Vector of the unit of measure.
COORDINATE – Coordinate of the unit of measure.
VALUE – Value of the unit of measure.
STATUS – Status of the patent.
SYMBOL – Symbol of the unit of measure.
TERMINATE – Terminated status of the patent.
DECIMALS – Decimal places of the unit of measure.

ARTIFICIAL INTELLIGENCE BASED METADATA SEMANTIC ENRICHMENT

BACKGROUND

The present application relates generally to an improved data processing apparatus and method and more specifically to an improved computing tool and improved computing tool operations/functionality for artificial intelligence based metadata semantic enrichment.

Artificial Intelligence (AI) computer models have been developed for various applications. As these AI computer models have been developed over time, there is now a large range of AI computer models that organizations and users can use to process input data and generate results. This range of AI computer models ranges from relative non-complex AI models such as rules based engines, to moderately complex AI models such as shallow classifiers, convolutional neural networks (CNNs), and the like, to high complexity AI models, such as deep learning neural networks (DNNs), large language models (LLMs), and the like, which are trained on massive amounts of data to perform highly complex operations handling large diversities in input data. The highly complex AI models, such as LLMs, e.g., ChatGPT available from OpenAI, LLaMA from Facebook, BARD available from Google, Inc., and the like, are often referred to as foundation models.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automatically generating semantical enhanced metadata for a structured data structure. The method comprises generating multi-task machine learning training data comprising separate sets of training data samples for each of a plurality of semantic metadata enhancement tasks. The method further comprises executing multi-task machine learning training of a base artificial intelligence (AI) computer model based on the multi-task machine learning training data to thereby generate a fine-tuned AI computer model trained to specifically generate semantically enhanced metadata for structured data structures, wherein the fine-tuned AI computer model is trained to perform the plurality of semantic metadata enhancement tasks. In addition, the method comprises receiving a prompt specifying a structure of an input structured data structure and requesting at least one of the semantic metadata enhancement tasks from the plurality of semantic metadata enhancement tasks. Moreover, the method comprises processing, by the fine-tuned AI computer model, the prompt to generate semantically enhanced metadata for the structure of the input structured data structure. Furthermore, the method comprises providing the semantically enhanced metadata to a downstream computing system for performing a downstream computing operation based on the semantically enhanced metadata.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram of example prompts/clues in accordance with one illustrative embodiment;

FIG. 4 is an example diagram of a user interface through which a prompt/clue and results of an AI computer operation may be presented in accordance with one illustrative embodiment.

DETAILED DESCRIPTION

Figure 1:
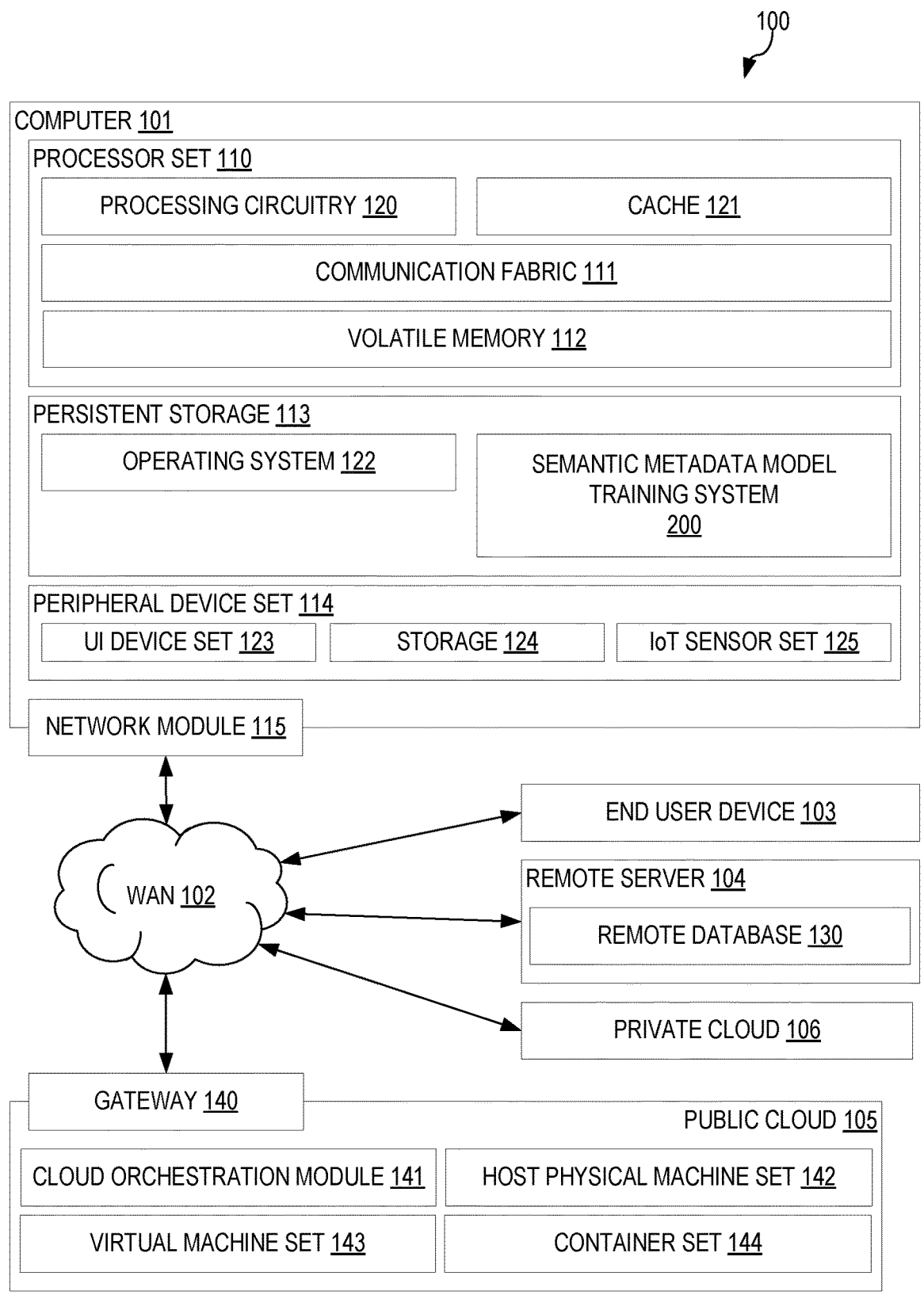
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for artificial intelligence based metadata enrichment of structured data structures, e.g., tables and the like, to facilitate additional computer operations, such as additional natural language processing, computer vision, and/or other artificial intelligence (AI) operations. In some illustrative embodiments, the improved computing tool and improved computing tool operations/functionality leverage the training on vast amounts of data provided in base foundation models, such as Large Language Models (LLMs), generative adversarial networks (GANs), variational auto-encoders (VAEs), or the like, as a basis for performing fine-tuned training of these foundation models for a particular plurality of tasks directed to metadata semantic enhancement for structured data structures. The fine-tuned training utilizes a specific set of training data that is specifically curated and compiled into batches of training samples, where each batch of training samples comprises proportional amounts of training data for each of the plurality of tasks. In some illustrative embodiments, each batch of the training samples comprises training data for opposite tasks that represent diametrically opposed or reverse operations, so as to address issues of training forgetfulness in the fine-tuned model that is generated from the training. For purposes of illustration throughout this description, it will be assumed that the foundation model is an LLM, however the illustrative embodiments are not limited to such and other foundation models may be utilized.

In some illustrative embodiments, the structured data structure is a table data structure having columns and rows, although the illustrative embodiments are not limited to structured data structures that are formulated as tables. To the contrary any structured data structure may be the basis of the semantically enhanced metadata generation of the mechanisms of the illustrative embodiments. Structured data is data that conforms to a data model and has a well-defined structure, follows a consistent order, and can be easily accessed and used by a person or a computer program. Unstructured data, on the other hand, is data that is not organized in a pre-defined manner and does not conform to a data model, such that it does not have an easily identifiable structure and cannot be processed easily by a computer program. An example of structured data structures include table data structures, whereas an example of unstructured data may be natural language documents. The illustrative embodiments operate on structured data structures where the structure itself provides a context for generating enhanced metadata for the structured data structure.

The table data structure may be part of a database, a data lake, or the like, and may suffer from a number of different issues. For example, in many table data structures of such databases/data lakes, the tables have short or generic column names, no column descriptions, missing table captions or table captions that provide little if any usefulness for downstream computer operations, e.g., computer vision operations, natural language processing based AI computer operations, etc., due to missing categories, tags, labels, or the like. The lack of such metadata makes it more difficult for these downstream computer operations, and especially natural language processing and machine learning based AI computer operations, to exploit the information present in the tables for performing their tasks.

For example, in some AI computer operations, it is beneficial to link columns of the table data structure with concepts/entities present in glossaries or ontology data structures used by the AI computer operations, such that relevant portions of the table may be retrieved inference reasoning. However, without sufficient metadata, and with the issues noted above with table data structures in databases and date lakes, it is difficult to perform such linkage of columns with concepts/entities in such glossary and ontology data structures. As a result, more complex analysis of the data in the table data structure itself is required to achieve such linkage, which requires a customer to provide access to the table data itself, which erodes the privacy and security of the customer's data. There is no existing open source publicly available foundation model, e.g., LLM, that can automatically generate different types of semantic metadata given only the limited information about the structure of the table data structure itself without accessing the private/sensitive data of the table data structure.

Hence, assuming that the structured data structure is a table data structure for purposes of illustration as a non-limiting example, the mechanisms of the illustrative embodiments operate to generate and/or semantically enhance metadata associated with this table data structure, such as by generating table captions, column descriptions, column datatypes, and tags for the table given only information about the structure of the table data structure itself, e.g., the column names. It should be noted that other structures of the table data structure may likewise be the subject of the illustrative embodiments and the illustrative embodiments are not limited to just columns and column names. However, it is recognized that rows of table data structures store the actual data, which can be subject to data privacy laws such as the European Union general data protection regulation (GDPR) of the like. Also, such row values may contain trade secrets and sensitive personal information (PI) which may contain bias. Such PIs are also subject to government regulation in various countries.

The metadata is generated based on the structure of the table data structure without needing to have access to the actual data itself within the table data structure. This helps maintain the privacy and security of the data by being able to semantically enhance the metadata of the structured data structure based only on the structure itself. In addition, in some illustrative embodiments, the metadata semantic enhancement may involve generating suggested column names given a table caption as input. The illustrative embodiments provide AI based computer tools that are trained to perform each of these metadata enrichment tasks as a multi-task AI computer model, using the foundation model as a base model which is the subject of this fine tuning machine learning. As such, the trained fine-tuned model may then perform any or all of these same metadata enrichment tasks on new input in response to a user prompt requesting one or more of these metadata enrichment operations.

The generated metadata may be associated with the table data structure, individual columns/rows of the table data structure, or the like. The generated/semantically enhanced metadata provided by the mechanisms of the illustrative embodiments may then be used in subsequent downstream operations to improve the performance of these downstream operations. For example, these subsequent downstream operations may include correlating tables, columns of tables, rows of tables, or the like, with various dictionaries or ontologies. These subsequent downstream operations may include performing table similarity evaluations based on the generated/semantically enhanced metadata. The generated/semantically enhanced metadata provided by the illustrative embodiments provide an additional basis by which to perform matching between the concepts/entities in the dictionary/ontology and the tables, columns within tables, rows within tables, or the like.

Thus, the illustrative embodiments provide an improved computing tool and improved computing tool operations/functionality for training a foundation model, e.g., LLM, based on automatically curated dataset of table metadata, so that the trained foundation model may process other structured data structures, e.g., other tables, and perform operations to automatically generate/semantically enhance the metadata associated with these other structured data structures. The training data used to train the foundation model does not use actual table contents, i.e., values in table cells. But only operates on the structure of the structured data structure itself and the content of the elements of this structure. That is, in order to generate metadata for one column of the table data structure, the trained foundation model may utilize the other columns as context for determining how to generate metadata for the given column.

In some illustrative embodiments, the training of the foundation model comprises a fine tuning of the foundation model based on a specifically curated training dataset comprising training data samples for a plurality of different metadata semantic enhancement tasks that the foundation model will be trained to perform. The training data samples themselves may be curated in a manner that implements automated training data sample enhancements applied to raw training data, where these training data sample enhancements operate to improve the usability of the training data samples for the particular multi-task machine learning training of the foundation model to fine tune the foundation model. These automatically applied training data sample curation enhancements may involve various enhancements such as modifying table captions to make them less specific, modifying or filtering column names that are determined to be too cryptic or not informative, detecting abbreviations and named entities, and filtering out tags containing such abbreviations or named entities, identifying metadata with terms that are not provided in a supported written/spoken language and excluding these from the training data, exploiting hierarchical categories in public electronic ontologies to enrich tags and generalize captions in the training data, and the like.

As noted above, the base model is a foundation model, such as a LLM, e.g., sequence-to-sequence model such as FLAN-T5 (from Google)/Sandstone (from IBM), or auto-regressive model such as BLOOM (from BigScience)/Granite (from IBM), that leverages the training of the LLM already performed for more general purposes, to thereby perform fine tune training of the base model using a curated training dataset comprising a collection of metadata terms, where the curated training dataset comprises training data samples specifically directed to one or more metadata enrichment tasks. Thus, the learning performed to train the original foundation model, also referred to herein as the base model, serves as a basis for the fine tuning which fine tunes this base model specifically for a plurality of tasks directed to semantic enrichment metadata generation/semantic enhancement for structured data structures, e.g., table data structure or the like. Hence, the knowledge represented in the original training of the LLM is not lost, but may be leveraged after fine tuning this knowledge to be improved specifically for the metadata enrichment tasks.

With regard to the fine tuning of the foundation model, the structure of the table data structure is represented in the input without having to provide private or confidential data in the table data structure itself, e.g., only the column names are provided. As such, for every column name in a table data structure (or just "table" hereafter), other column names in the same table are exploited as context. The model is trained in a multi-task learning setting and the parameters of the same model are shared for generation of different types of metadata, as mentioned earlier.

The fine tuning is based on the prepared training and validation data obtained from existing structured data structure, e.g., table, metadata. Because such metadata in real world tables are often noisy or incomplete, the mechanisms of the illustrative embodiments curate the training data, e.g., automatically modifying table captions to make them less specific, automatically modifying or filtering column names, tags and descriptions, that are too cryptic or not informative, and the like, as noted above. Part of this data preparation involves combining information from different sources.

Once the training data is prepared, the training data is turned into individual training and validation instances, or "samples", for different target semantic enrichment tasks. This involves creating appropriate prompts/clues and use them to structure the metadata in the source and target text for fine-tuned machine learning training of the base AI computer model, e.g., the foundation model such as LLM.

The training and validation instances for all of the metadata semantic enhancement tasks together are processed, such as via batches, in a multi-task machine learning operation to train the base AI computer model, e.g., the LLM (e.g., BLOOMZ, FLAN-T5, etc.). Depending on the particular base AI computer model, the multi-task machine learning training is performed in appropriately sized batches (e.g., 64, 128, 256, 512 samples), or in a sequential manner so that each batch contains substantially equal proportion of training instances per task to avoid situations when the model may "forget" about prompts of a certain task that have relatively fewer training instances, and have not been seen in some number of immediately preceding training batches. That is, machine learning training biases the training to the samples seen during training and thus, if the model sees mostly training samples for a particular task, it may be less accurate with regard to other tasks. By maintaining a substantially equal proportion of training instances, or samples, for each task, the biasing of the fine-tuned model to one task over others is minimized.

The fine-tuned model, or metadata semantic enhancement AI computer model, is then deployed for use in semantically enhancing metadata for a table data structure that is used to perform an end-to-end task, such as table column to glossary concept matching, table comparison operation, or the like. The end-to-end task may return results data indicating a successfulness, or unsuccessfulness of the end-to-end task, e.g., whether or not the end-to-end task was able to successfully match columns to glossary concepts, or the like. The successful/unsuccessful result data may be used as reinforcement learning feedback information that is used to update the training of the fine-tuned model, e.g., may be used as a reward model for further fine-tuning the model using reinforcement learning.

Thus, the illustrative embodiments provide an improved computing tool and improved computing tool operations/functionality for generating and/or semantically enhancing metadata of structured data structures, e.g., tables, to provide additional semantic data upon which AI computer model operations may be performed. As a result, the illustrative embodiments specifically improved the structured data structures specifically for AI computer model operations and in turn, improved the operations of the AI computer models by providing additional metadata that improves the accuracy of the results generated by the AI computer models that rely on metadata.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides artificial intelligence (AI) computer model mechanisms that are trained from a base foundation model specifically for semantically enhancing metadata of structured data structures, e.g., table data structures. The improved computing tool implements mechanism and functionality, such as a semantic metadata model training system, which cannot be practically performed by human beings either outside of, or with the assistance of, a technical environment, such as a mental process or the like. The improved computing tool provides a practical application of the methodology at least in that the improved computing tool is able to generate/semantically enhance metadata associated with structured data structures such that the knowledge in these structured data structures can be utilized in performing AI computer model based operations and thereby improves the structured data structures and the subsequent AI computer model based operations that rely on such metadata, which increases the accuracy of the results generated by these AI computer model operations.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as semantic metadata model training system 200. In addition to semantic metadata model training system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and semantic metadata model training system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in semantic metadata model training system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in semantic metadata model training system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a semantic metadata model training system 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated generation/semantic enhancement of metadata associated with a structured data structure such that the enhanced structured data structure may be used by downstream computer operations, such as downstream AI computer model based operations, to perform operations based on the generated/enhanced metadata. The generation/semantic enhancement of metadata for structured data structures provides such metadata without having to have access to the data within the structured data structure itself, but uses only the structure itself as the context for generating the semantically enhanced metadata.

Figure 2:
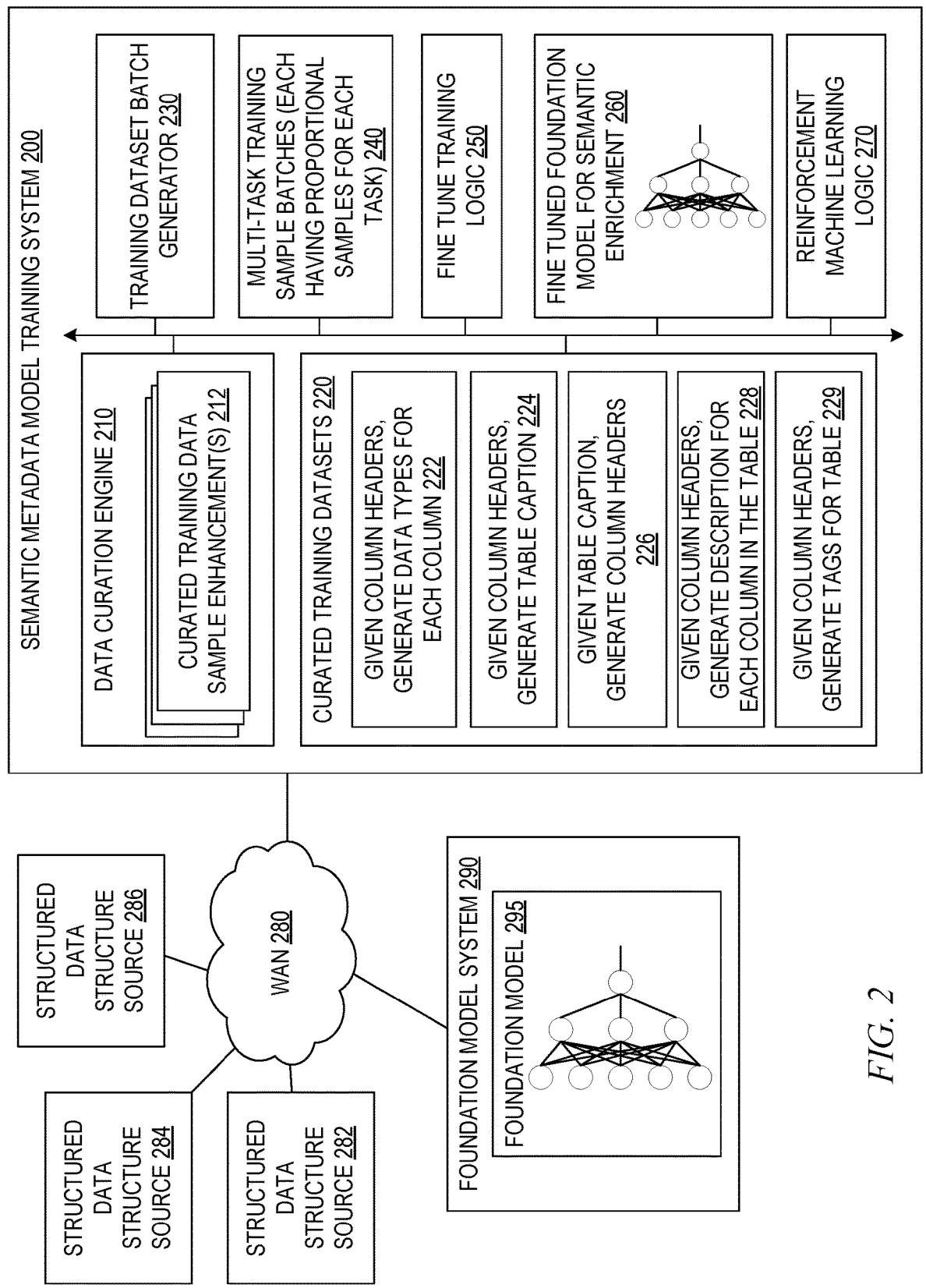
FIG. 2 is an example block diagram illustrating the primary operational components of a semantic metadata model training system in accordance with one illustrative embodiment.

FIG. 2 is an example block diagram illustrating the primary operational components of a semantic metadata model training system in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., prompts specifying structured data structure features and a requested metadata enhancement task to be performed, and the resulting output may aid human beings, e.g., recommended semantically enhanced metadata, automatically generated semantically enhanced structured data structures, or the like. The invention is specifically directed to the automatically operating computer components directed to improving structured data structures, and providing a specific solution that automatically generates/semantically enhances metadata of a structured data structure by implementing specific multi-task training of a foundation model specifically for metadata generation/semantic enhancement tasks, which cannot be practically performed by human beings as a mental process, and which are not directed to organizing any human activity.

As shown in FIG. 2, the semantic metadata model training system 200 comprises a data curation engine 210, a curated training dataset storage 220, a training dataset batch generator 230, a multi-task training sample batches storage 240, fine tune training logic 250, a fine-tuned foundation model for semantic enrichment 260, and reinforcement machine learning logic 270. These components of the semantic metadata model training system 200 operate on training data obtained from various structured data structure source computing systems 282-286 via the network 280, which may comprise one or more local or wide area networks, such as the Internet, or the like, and which may be accessed via wired and/or wireless communication links. The semantic metadata model training system 200 further operates on a base model, such as a foundation model 295 available from a foundation model system 290 via the one or more networks 280. The semantic metadata model training system 200 operates on the base model and fine tunes the base model for the specific application of generating/semantically enhancing metadata associated with structured data structures, e.g., tables, where the training involves s multi-task training on the same base model where at least some of the tasks in the multi-task training are opposite tasks, and the training dataset is compiled into batches with substantially proportional numbers of training samples for each of the tasks in the multi-task training. The resulting fine-tuned model is then deployed for use with new structured data structures to automatically generate/semantically enhance metadata associated with the new structured data structures such that they may be used to generate more accurate results by downstream computing operations, such as downstream AI computing operations.

It should be appreciated that while the computing systems 282-286 and 290 are shown as individual computing systems, in actuality these systems 282-286 and 290 may be many computing devices in communication with one another or otherwise orchestrated to provide data structures for use, e.g., the foundation model system 290 may in fact be a cloud computing system or other distributed computing system that may service requests from various computing devices, including the semantic metadata model training system 200. In some illustrative embodiments, the mechanisms of semantic metadata model training system 200 may be integrated with the foundation model system 290. Moreover, the semantic metadata model training system 200 may operate as a cloud computing system and provide cloud services for generating/semantically enhancing metadata associated with structured data structures, such as table data structures or the like.

In some illustrative embodiments, the semantic metadata model training system 200, or the fine-tuned foundation model for semantic enrichment 290 generated by the semantic metadata model training system 200, may operate in conjunction with, or as part of, a foundation model system 290 for providing a user interface through which users can provide conversational type commands to elicit performance of an AI operation by the foundation model, e.g., a natural language interface such as provided by an LLM, e.g., ChatGPT, in which results of the AI operation are returned in a conversational manner. Thus, a user may submit a prompt specifying column names and a request for an enhanced metadata generation task, and the prompt will be input to the fine-tuned foundation model for semantic enrichment 290, processed, and the enhanced metadata for the specified column names may be output or provided to the user based on the fine-tuned foundation model for semantic enrichment 290 (hereafter referred to simply as the "fine-tuned model") multi-task training. In some cases, where the user provides the actual structured data structure, the metadata may be automatically integrated with the structured data structure.

In order to perform such operations, the fine-tuned model must first be trained from a base foundation model 295 available from the foundation model system 290. For example, the foundation model 295 may be a large language model (LLM) or other type of foundation model. Assuming an LLM embodiment, the semantic metadata model training system 200 has access to the LLM 295 via the foundation model system 290 and operates to perform fine-tuning of the LLM 295 specifically for the generation of semantically enhanced metadata for structured data structures, such as tables, which may be part of a database, data lake, or the like. The fine-tuned model 260 is then deployed for use in generating enhanced metadata for newly specified structured data structures, e.g., new prompts specifying column names and requesting a metadata enhancement task to be performed.

In order to perform the fine-tuning of the LLM 295, the semantic metadata model training system first collects and curates training data samples for use in a multi-task fine-tuning machine learning training operation. The semantic metadata model training system 200 comprises a data curation engine 210 that comprises computer logic to collect raw structured data structure information from the source computing systems 282-286, e.g., existing tables from these source computing systems 282-286. The raw structured data structure information may include information about the structure of these structured data structures as well as the metadata of these structured data structures, e.g., the structure of the table and the metadata for the table.

Because such metadata in real world tables are often noisy or incomplete, the data curation engine 210 comprises curated training data sample enhancement logic 212 that operates to curate the training data samples. The curated training data sample enhancement logic 212 may operate to perform one or more enhancements to make the training data samples more usable for multi-task machine learning training of a foundation model, e.g., LLM 295. These enhancements of the training data samples includes, but is not limited to, for example, automatically modifying table captions to make them less specific, automatically modifying or filtering column names, tags and descriptions, that are too cryptic or not informative, and the like.

For example, in one illustrative embodiment, the data curation engine 210 may curate the real world tables to a select set of tables. In a first step, each of the tables of the training data samples are filtered by first filtering the columns of the table on column names determined to be not useful, such as consisting of non-alphabetic characters only, containing quotations, or containing tokens that are too large (e.g., greater than 25 characters), etc. If the remaining number of columns is less than a predetermined number, e.g., 3, the corresponding table is skipped, i.e., filtered out from further use.

In a second step, table captions are automatically modified to make them less specific (e.g., captions often contain years and/or months which can be generalized). In addition, table captions are checked with most frequent multi-words and a small set of multi-words (e.g., "Data charts", "table of contents", etc.) are identified which can be reliably used to identify table captions that are not of good quality. If any table caption has less than a predetermined number of tokens, e.g., 3 tokens, or any of the aforementioned multi-words, a first sentence of the table description (if exists in the corresponding table metadata) is selected as a table caption after normalizing the datetime information, if there is any. In addition, table captions with terms in a language that is not preferred may be eliminated.

In a third step, tables with unique captions are kept. Often there are multiple tables with the same caption coming from the same source. The illustrative embodiments may randomly pick one in such scenario and discard the others. In a fourth step, tags and captions are curated by filtering out any tag or caption that contains a named entity (person, location, or organization). Moreover, any tag that is an acronym may be filtered out. To detect named entities, an open source state-of-the-art named entity recognition (NER) system may be utilized. To detect acronyms, algorithms that exploit the LLM's tokenizer may be used to identify acronyms.

Once the training data is prepared by collecting raw training data samples and curating them, which includes enhancing the training data samples using the curated training data sample enhancement(s) logic 212, the curated training data samples are processed and turned into individual training and validation instances, for different target semantic enrichment tasks. This involves creating appropriate prompts/clues, such as shown in FIG. 3, and using them to structure the metadata in the source and target text of these training data samples for fine-tuned machine learning training of the base AI computer model, e.g., the LLM 295. In some illustrative embodiments, there are a plurality of semantic metadata enhancement tasks for which training data samples are needed to perform the multi-task machine learning training of the LLM 295. For example, one semantic metadata enhancement may be to generate data types for each column of a table, when given column headers for the table. Another semantic metadata enhancement may be to generate a table caption when given column headers for the table. Yet another semantic metadata enhancement may be to generate column headers when given the table caption. Still another semantic metadata enhancement may be to generate a description for each column in the table when given the column headers of the table. In addition, another semantic metadata enhancement may be to generate tags for the table when given the column headers for the table. As can be seen from the above, most of the semantic metadata enhancements only require an input of the column headers for the table in order to provide the semantically enhanced metadata, while one enhancement requires the providing of the table caption in order to generate the column headers, which is an opposite task of the task for generating a table caption when given the column headers.

The data curation engine 210 generates prompts/clues for each of these different semantic metadata enhancement tasks to generate corresponding curated training data samples 220. For example, a first set of training data samples 222 are generated for the semantic metadata enhancement task to generate data types for each column of a table, when given column headers for the table. A second set of training data samples 224 are generated for the semantic metadata enhancement task to generate a table caption when given column headers for the table. A third set of training data samples 226 are generated for the semantic metadata enhancement task to generate column headers when given the table caption. A fourth set of training data samples 228 are generated for the semantic metadata enhancement task to generate a description for each column in the table when given the column headers of the table. A fifth set of training data samples 229 are generated for the semantic metadata enhancement task to generate tags for the table when given the column headers for the table. It should be noted that, while it is preferred to have a substantially equal number of training data samples in each of the sets 222-229, this is not required and there may be different numbers of training data samples in each of the sets 222-229.

With reference again to FIG. 3, this figure shows examples of training data samples that are generated by the data curation engine 210 based on the curated training data samples generated by the data curation engine 210 by applying the curated training data sample enhancements 212. As shown in FIG. 3, each prompt/clue 310-340 comprises a description of the structure 350 of the table, referenced as "source" in these examples, and a target result or ground truth 360 that should be generated as semantically enhanced metadata for the particular semantic metadata enhancement task. The target result or ground truth 360 may be obtained from the curated metadata of the existing table as represented in the curated training data sample. The description of the structure 350 of the table may be obtained from the column names, table caption, or other structure information of the table provided in the curated training data samples. Templates for generating prompts/clues for each semantic metadata enhancement task may be utilized to generate these prompts/clues by insertion of the corresponding training data sample information into the appropriate fields of the templates, e.g., insert name of table in a first field, insertion of column names in a second field, insertion of a target result in a third field, with additional prompt/clue content being provided in the template itself, e.g., the particular requested semantic metadata enhancement task such as "Table caption", "Column names," "Table tags", and "Column description" in the depicted examples.

It should be appreciated that the structure of the table data structure is represented in these prompts/clues without having to provide private or confidential data in the table data structure itself, e.g., only the column names are provided. As such, for every column name in a table data structure, other column names in the same table are exploited as context for the multi-task machine learning training of the foundation model, e.g., LLM 295. The model 295 is trained in a multi-task learning setting and the parameters of the same model 295 are shared for generation of different types of semantically enhanced metadata, as mentioned earlier. Thereafter, new inputs to the trained model, e.g., model 260, are likewise formatted as prompts/clues, but without the "target" provided in the training data samples, as the trained model 260 will generate the requested results in terms of semantically enhanced metadata for the given new inputs.

Thus, the training data samples 222-229 comprise the prompts/clues, such as 310-340 in FIG. 3, for each of the different semantic metadata enhancement tasks. For example, prompt/clue 310 may be part of the set of training data samples in set 224, prompt/clue 320 may be part of the set of training data samples in set 226, prompt/clue 330 may be part of the set of training data samples in set 229, and prompt/clue 340 may be part of the set of training data samples in set 228. Each of the sets of training data samples 222-229 may be partitioned into training and validation subsets, where the training subset is used to perform fine-tuning machine learning training of the LLM 295 by the fine tune training logic 250, and the validation subset is used by the fine tune training logic 250 to validate satisfactory operation, e.g., sufficient accuracy in results generated, of the fine-tuned foundation model for semantic enrichment 260, i.e., the fine-tuned trained LLM 295.

The training and validation instances for all of the metadata semantic enhancement tasks together are processed, such as via batches, in a multi-task machine learning operation, executed by the fine tune training logic 250, to train the base AI computer model, e.g., the LLM 295. Depending on the particular base AI computer model 295, the multi-task machine learning training is performed in appropriately sized batches (e.g., 64, 128, 256, 512 samples) 240, and/or in a sequential manner so that each batch in the multi-task training sample batches 240 contains substantially equal proportion of training instances per task to avoid situations when the model may "forget" about prompts/clues 222-229 of a certain task that have relatively fewer training instances, and have not been seen in some number of immediately preceding training batches. As mentioned above, machine learning training biases the training to the samples seen during training and thus, if the model sees mostly training samples for a particular task, e.g., significantly more training samples for task 222 and significantly less training samples for task 226, it may be less accurate with regard to this other task 226. By maintaining a substantially equal proportion of training instances, or samples, for each task, the biasing of the fine-tuned foundation model for semantic enrichment 260 to one task, e.g., 222, over others 224-229 is minimized.

The training dataset batch generator 230 comprises computer logic to generate the multi-task training sample batches 240. That is, the generator 230 selects training data samples from the various sets 222-229 for inclusion into batches where each batch comprises a substantially equal number of training data samples for each of the semantic metadata enrichment tasks supported. For example, each batch may have X number of training data samples for each of the semantic metadata enrichment tasks selected form the sets 222-229. It should be appreciated that this is a "substantially" equal number of training data samples, where substantially may be measured by a threshold number difference between the number of training data samples from one task to another, e.g., for task 1 there may be X training data samples, whereas for task 2 there may be X+Y or X−Y training data samples, where Y may be the threshold number difference, or any number between X and X+Y or X−Y. As it is preferable to have the same number of training data samples for each semantic metadata enhancement task, in some illustrative embodiments, the training dataset batch generator 230 may reuse training data samples from one or more of the sets 222-229 in order to provide such equivalent number of training data samples in a batch.

The fine tune training logic 250 performs batch based machine learning training of the LLM 295 using the multi-task training sample batches 240. The fine tune training logic 250 may train the LLM 295 by processing a batch of training data samples, comprising samples for a plurality of semantically enhanced metadata tasks, and then adjust operational parameters of the LLM 295 based on an error/loss calculated between the generated results and the target or ground truth for the processed training data samples, to thereby generate a modified LLM 295. This process is repeated for each of the batches in the multi-task training sample batches 240. This constitutes an iteration or epoch of the multi-task machine learning training operation. This process may be repeated for multiple iterations or epochs until the fine-tuned model generates results with an error/loss equal to or less than a given threshold error/loss or until a predetermined number of iterations or epochs have occurred. At such point, the fine-tuned foundation model for semantic enrichment 260 is produced as a converged or trained model.

The fine-tuned model 260, or fine-tuned foundation model for semantic enrichment 260, is then deployed for use in semantically enhancing metadata for table data structures, which may be used to perform an end-to-end task, such as table column to glossary concept matching, table comparison operation, or the like, where this end-to-end task may be a supportive task for other AI computer operations, or may be the AI computer operation itself. The end-to-end task may return results data indicating a successfulness, or unsuccessfulness of the end-to-end task, e.g., whether or not the end-to-end task was able to successfully match columns to glossary concepts, or the like. The successful/unsuccessful result data may be used as reinforcement learning feedback information that is used by the reinforcement machine learning logic 270 to update the training of the fine-tuned model, e.g., may be used as a reward model for further fine-tuning the model using reinforcement learning. For example, in cases where the trained model 260 generates a result with low confidence of matching with an ontology, an unsuccessful result may be indicated and the input may be maintained as additional training data and may be augmented with target or ground truth data for further training of the model 260. The same may be done for successful results as well. Thus, the runtime inputs to the trained model 260 may be used as further training data to improve the performance of the model 260 by performing a subsequent training of the trained model 260.

Thus, the illustrative embodiments provide an improved computing tool and improved computing tool operations/functionality for artificial intelligence based metadata enrichment of structured data structures, e.g., tables and the like, to facilitate additional computer operations, such as additional natural language processing, computer vision, and/or other artificial intelligence (AI) operations. In some illustrative embodiments, the improved computing tool and improved computing tool operations/functionality leverage the training on vast amounts of data provided in base foundation models, such as Large Language Models (LLMs), as a basis for performing fine-tuned training of these foundation models for a particular plurality of tasks directed to metadata semantic enhancement for structured data structures. The fine-tuned training utilizes a specific set of training data that is specifically curated and compiled into batches of training samples, where each batch of training samples comprises proportional amounts of training data for each of the plurality of tasks. In some illustrative embodiments, each batch of the training samples comprises training data for opposite tasks that represent diametrically opposed or reverse operations, so as to address issues of training forgetfulness in the fine-tuned LLM that is generated from the training.

In some illustrative embodiments, the structured data structure is a table data structure having columns and rows. The table data structure may be part of a database, a data lake, or the like, and may suffer from a number of different issues. The mechanisms of the illustrative embodiments operate to generate and/or semantically enhance metadata associated with this table data structure, such as by generating table captions, column descriptions, column datatypes, and tags for the table given only information about the structure of the table data structure itself, e.g., the column names. That is, the metadata is generated without needing to have access to the actual data itself in the table data structure. This helps maintain the privacy and security of the data by being able to semantically enhance the metadata of the structured data structure based only on the structure itself. In addition, in some illustrative embodiments, the metadata semantic enhancement may involve generating suggested column names given a table caption as input. The illustrative embodiments provide AI based computer tools that are trained to perform each of these metadata enrichment tasks as a multi-task AI computer model, using the foundation model as a base model which is the subject of this fine tuning machine learning. As such, the trained fine-tuned model may then perform any or all of these same metadata enrichment tasks on new input in response to a user prompt requesting one or more of these metadata enrichment operations.

The generated metadata may be associated with the table data structure, individual columns/rows of the table data structure, or the like. The generated/semantically enhanced metadata provided by the mechanisms of the illustrative embodiments may then be used in subsequent downstream operations to improve the performance of these downstream operations. For example, these subsequent downstream operations may include correlating tables, columns of tables, rows of tables, or the like, with various dictionaries or ontologies. These subsequent downstream operations may include performing table similarity evaluations based on the generated/semantically enhanced metadata. The generated/semantically enhanced metadata provided by the illustrative embodiments provide an additional basis by which to perform matching between the concepts/entities in the dictionary/ontology and the tables, columns within tables, rows within tables, or the like.

FIG. 4 is an example diagram of a user interface through which a prompt/clue and results of an AI computer operation may be presented in accordance with one illustrative embodiment. In the depicted example, a user may input, via a natural language user interface, a prompt/clue specifying a structure of a table and requesting one or more semantic metadata enhancements be performed based on this structure. For example, a user may specify, in input 410, the structure of the table, e.g., the column names of a table, and request that the system generate semantically enhanced metadata including a title and tags for the table and a description for the columns. In some instances, as depicted in FIG. 4, the user may provide a natural language prompt, such as "Generate title and tags for the table, and description for the columns", while specifying the columns of the table. The prompt/clue is input to the fine-tuned trained model 260 in FIG. 2, which has been deployed to this system for natural language conversation, e.g., an LLM system 290. The fine-tuned trained model 260 processes the prompt/clue and generates the title, tags, and description of the column names as semantically enhanced metadata 420 for the specified table structure. Moreover, the table data structure itself may be generated or augmented to include the semantically enhanced metadata.

Figure 5:
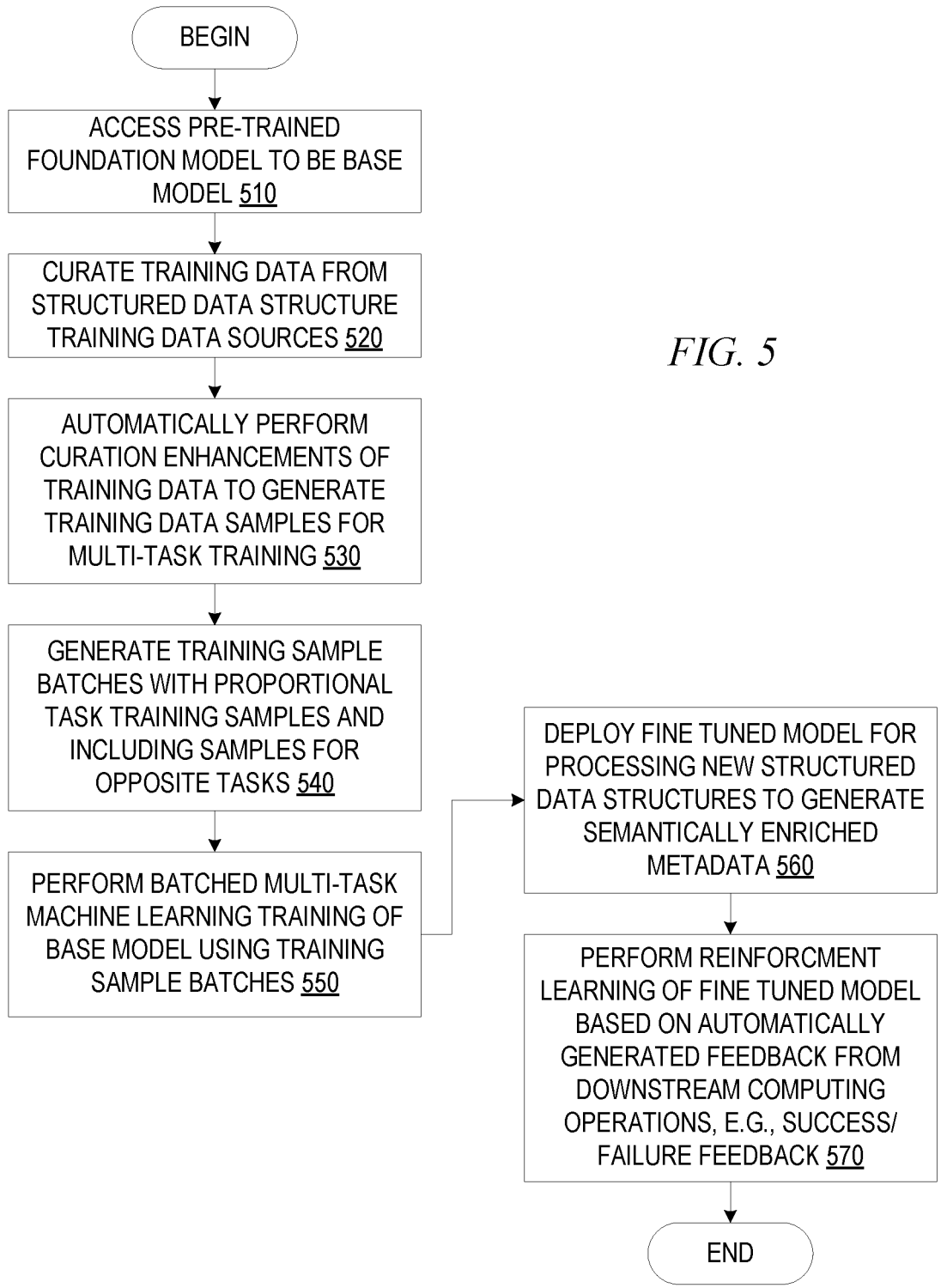
FIG. 5 presents a flowchart outlining example operations of elements of the present invention with regard to one or more illustrative embodiments.

FIG. 5 presents a flowchart outlining example operations of elements of the present invention with regard to one or more illustrative embodiments. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

As shown in FIG. 5, the operation starts by accessing a pre-trained foundation model, e.g., an LLM, which operates as the base model and has a base model training that is more general (step 510). Training data is curated from structured data structure training data source computing systems (step 520). Curation enhancements are automatically performed on the training data samples collected to thereby generate training data samples for multi-task training (step 530). The training samples are then used to generate training sample batches with each batch having a substantially proportional number of training samples for each semantic metadata enhancement task, with some of the tasks being opposite tasks (step 540).

The batches of training samples are then used to perform multi-task machine learning training of the base model (step 550). The resulting trained model, i.e., the fine-tuned model, is deployed for processing new structured data structures to generate semantically enriched metadata (step 560). During the runtime operation of this fine-tuned model, results are generated by the fine-tuned model and provided as feedback which may then be used to perform reinforcement learning of the fine-tuned model (step 570). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for automatically generating semantical enhanced metadata for a structured data structure, the method comprising:
generating multi-task machine learning training data comprising separate sets of training data samples for each of a plurality of semantic metadata enhancement tasks;
executing multi-task machine learning training of a base artificial intelligence (AI) computer model based on the multi-task machine learning training data to thereby generate a fine-tuned AI computer model trained to specifically generate semantically enhanced metadata for structured data structures, wherein the fine-tuned AI computer model is trained to perform the plurality of semantic metadata enhancement tasks;
receiving a prompt specifying a structure of an input structured data structure and requesting at least one of the semantic metadata enhancement tasks from the plurality of semantic metadata enhancement tasks;
processing, by the fine-tuned AI computer model, the prompt to generate semantically enhanced metadata for the structure of the input structured data structure; and
providing the semantically enhanced metadata to a downstream computing system for performing a downstream computing operation based on the semantically enhanced metadata.

2. The method of claim 1, wherein the input structured data structure is a table data structure and the structure of the input structured data structure comprises column names of the table data structure.

3. The method of claim 2, wherein the semantic metadata enhancement tasks comprise at least one of generating table captions, generating column descriptions, generating column datatypes, or generating tags for portions of the table data structure.

4. The method of claim 1, wherein the base AI computer model is a previously trained foundation model that is trained on a large and varied set of data for general applicability.

5. The method of claim 4, wherein the previously trained foundation model is one of a large language model (LLM), a generative adversarial network (GAN), or a variational autoencoder (VAE).

6. The method of claim 1, wherein executing multi-task machine learning training of a base artificial intelligence (AI) computer model based on the multi-task machine learning training data comprises generating a plurality of batches of training data samples from the multi-task machine learning training data, wherein each batch comprises a proportional number of training data samples for each of the semantic metadata enhancement tasks.

7. The method of claim 6, wherein each batch of training data samples comprises at least two training data samples for opposite semantic metadata enhancement tasks.

8. The method of claim 1, wherein the multi-task machine learning training data is generated by curating a larger size training data to a selected subset of training data at least by filtering the larger size training data based on filtering criteria that eliminates structured data structures, or portions of structured data structures, that are determined to be not informative with regard to the structure of the structured data structure.

9. The method of claim 2, wherein the downstream computing operation comprises at least one of correlating the table data structure, or portions of the table data structure, with one of dictionaries or ontologies, or performing a table data structure similarity evaluation with one or more other table data structures.

10. The method of claim 1, wherein processing the prompt is performed without accessing the data within the structured input structured data structure.

11. A computer program product comprising a computer readable storage medium having a computer readable program stored therein, wherein the computer readable program, when executed on a computing device, causes the computing device to:
generate multi-task machine learning training data comprising separate sets of training data samples for each of a plurality of semantic metadata enhancement tasks;
execute multi-task machine learning training of a base artificial intelligence (AI) computer model based on the multi-task machine learning training data to thereby generate a fine-tuned AI computer model trained to specifically generate semantically enhanced metadata for structured data structures, wherein the fine-tuned AI computer model is trained to perform the plurality of semantic metadata enhancement tasks;

receive a prompt specifying a structure of an input structured data structure and requesting at least one of the semantic metadata enhancement tasks from the plurality of semantic metadata enhancement tasks;

process, by the fine-tuned AI computer model, the prompt to generate semantically enhanced metadata for the structure of the input structured data structure; and provide the semantically enhanced metadata to a downstream computing system for performing a downstream computing operation based on the semantically enhanced metadata.

12. The computer program product of claim 11, wherein the input structured data structure is a table data structure and the structure of the input structured data structure comprises column names of the table data structure.

13. The computer program product of claim 12, wherein the semantic metadata enhancement tasks comprise at least one of generating table captions, generating column descriptions, generating column datatypes, or generating tags for portions of the table data structure.

14. The computer program product of claim 11, wherein the base AI computer model is a previously trained foundation model that is trained on a large and varied set of data for general applicability.

15. The computer program product of claim 14, wherein the previously trained foundation model is one of a large language model (LLM), a generative adversarial network (GAN), or a variational autoencoder (VAE).

16. The computer program product of claim 11, wherein executing multi-task machine learning training of a base artificial intelligence (AI) computer model based on the multi-task machine learning training data comprises generating a plurality of batches of training data samples from the multi-task machine learning training data, wherein each batch comprises a proportional number of training data samples for each of the semantic metadata enhancement tasks.

17. The computer program product of claim 16, wherein each batch of training data samples comprises at least two training data samples for opposite semantic metadata enhancement tasks.

18. The computer program product of claim 11, wherein the multi-task machine learning training data is generated by curating a larger size training data to a selected subset of training data at least by filtering the larger size training data based on filtering criteria that eliminates structured data structures, or portions of structured data structures, that are determined to be not informative with regard to the structure of the structured data structure.

19. The computer program product of claim 11, wherein processing the prompt is performed without accessing the data within the structured input structured data structure.

20. An apparatus comprising:

at least one processor; and at least one memory coupled to the at least one processor, wherein the at least one memory comprises instructions which, when executed by the at least one processor, cause the at least one processor to:

generate multi-task machine learning training data comprising separate sets of training data samples for each of a plurality of semantic metadata enhancement tasks;

execute multi-task machine learning training of a base artificial intelligence (AI) computer model based on the multi-task machine learning training data to thereby generate a fine-tuned AI computer model trained to specifically generate semantically enhanced metadata for structured data structures, wherein the fine-tuned AI computer model is trained to perform the plurality of semantic metadata enhancement tasks;

receive a prompt specifying a structure of an input structured data structure and requesting at least one of the semantic metadata enhancement tasks from the plurality of semantic metadata enhancement tasks;

process, by the fine-tuned AI computer model, the prompt to generate semantically enhanced metadata for the structure of the input structured data structure; and provide the semantically enhanced metadata to a downstream computing system for performing a downstream computing operation based on the semantically enhanced metadata.

* * * * *